US010577976B2

(12) United States Patent
Izquierdo et al.

(10) Patent No.: US 10,577,976 B2
(45) Date of Patent: Mar. 3, 2020

(54) MOUNTING ASSEMBLY WITH ROTATABLE AND/OR TRANSLATABLE RETAINER PINS

(71) Applicant: United Technologies Corporation, Farmington, CT (US)

(72) Inventors: Felix Izquierdo, Palm Beach Gardens, FL (US); James P. Greenbaum, Bethesda, MD (US)

(73) Assignee: United Technologies Corporation, Farmington, CT (US)

( * ) Notice: Subject to any disclaimer, the term of this patent is extended or adjusted under 35 U.S.C. 154(b) by 101 days.

(21) Appl. No.: 15/797,307

(22) Filed: Oct. 30, 2017

(65) Prior Publication Data

US 2019/0128142 A1   May 2, 2019

(51) Int. Cl.
| | |
|---|---|
| *F01D 25/24* | (2006.01) |
| *F01D 25/28* | (2006.01) |
| *F01D 25/26* | (2006.01) |
| *F16B 19/02* | (2006.01) |
| *F16B 37/04* | (2006.01) |

(52) U.S. Cl.
CPC .......... *F01D 25/243* (2013.01); *F01D 25/26* (2013.01); *F01D 25/265* (2013.01); *F01D 25/28* (2013.01); *F16B 19/02* (2013.01); *F16B 37/044* (2013.01); *F05D 2220/32* (2013.01); *F05D 2230/64* (2013.01); *F05D 2260/30* (2013.01); *F05D 2260/31* (2013.01)

(58) Field of Classification Search
CPC . B64D 27/26; F05D 2260/31; F05D 2230/64; F01D 25/28; F01D 25/243
USPC ....................................................... 248/554
See application file for complete search history.

(56) References Cited

U.S. PATENT DOCUMENTS

| | | | |
|---|---|---|---|
| 3,431,813 A | 3/1969 | Johnson | |
| 3,905,633 A | 9/1975 | Larson | |
| 4,943,013 A * | 7/1990 | Kapala | B64D 27/26 244/54 |
| 5,431,534 A * | 7/1995 | Charbonnel | F01D 21/003 415/118 |
| 6,173,919 B1 * | 1/2001 | Le Blaye | B64D 27/26 244/54 |
| 6,843,449 B1 * | 1/2005 | Manteiga | B64D 27/26 244/54 |
| 7,371,042 B2 * | 5/2008 | Lee | F01D 5/027 415/119 |

(Continued)

FOREIGN PATENT DOCUMENTS

WO   2007132408   11/2007

OTHER PUBLICATIONS

EP search report for EP18191568.7 dated Mar. 22, 2019.

*Primary Examiner* — Bradley Duckworth
(74) *Attorney, Agent, or Firm* — Getz Balich LLC

(57) ABSTRACT

An assembly is provided that includes a first component, a second component, a plurality of retainers and a fastener. The first component is configured with a plurality of first apertures. The second component is configured with a plurality of second apertures. Each of the retainers includes a pin and an arm projecting out from an end of the pin. The pin of each of the retainers is mated with a respective one of the first apertures and a respective one of the second apertures. The fastener is configured to fixedly connect the arm of each of the retainers to the first component.

19 Claims, 10 Drawing Sheets

(56) References Cited

U.S. PATENT DOCUMENTS

| | | | |
|---|---|---|---|
| 7,721,522 B2 * | 5/2010 | Farah | F02K 1/002 |
| | | | 60/39.5 |
| 7,766,574 B2 * | 8/2010 | Maffre | F01D 5/066 |
| | | | 403/337 |
| 8,443,612 B2 | 5/2013 | Foster | |
| 8,794,587 B2 * | 8/2014 | Cant | F01D 5/3053 |
| | | | 248/672 |
| 9,222,369 B2 * | 12/2015 | Mulcaire | F01D 25/243 |
| 9,328,764 B2 | 5/2016 | Plickys | |
| 9,453,525 B2 | 9/2016 | Foster | |
| 9,702,258 B2 * | 7/2017 | Mayer | F01D 25/28 |
| 2008/0230675 A1 | 9/2008 | Audart-Noel et al. | |
| 2009/0266933 A1 | 10/2009 | Foster | |
| 2014/0147266 A1 | 5/2014 | Kramer | |
| 2014/0161593 A1 | 6/2014 | Ruberte Sanchez et al. | |
| 2016/0061450 A1 | 3/2016 | Pankey | |
| 2016/0169155 A1 * | 6/2016 | Indersie | B23P 15/008 |
| | | | 239/265.11 |
| 2017/0260877 A1 * | 9/2017 | King | F01D 25/243 |
| 2018/0087399 A1 * | 3/2018 | Quennehen | F01D 11/08 |
| 2018/0187571 A1 * | 7/2018 | Recuero | F02C 7/20 |
| 2018/0272514 A1 * | 9/2018 | Pergantis | B25D 1/16 |
| 2018/0355762 A1 * | 12/2018 | Tripodina | F01D 25/28 |
| 2019/0092484 A1 * | 3/2019 | Whiteford | B64D 27/26 |
| 2019/0144124 A1 * | 5/2019 | Zameroski | B64C 27/001 |
| 2019/0203605 A1 * | 7/2019 | Thomas | F01D 25/246 |

\* cited by examiner

MOUNTING ASSEMBLY WITH ROTATABLE AND/OR TRANSLATABLE RETAINER PINS

This disclosure was made with government support under Contract No. FA8626-16-C-2139 awarded by the United States Air Force. The government may have certain rights in the disclosure.

BACKGROUND OF THE DISCLOSURE

1. Technical Field

This disclosure relates to an assembly for removably mounting a first component to a second component of, for example, a gas turbine engine.

2. Background Information

Various types and configurations of component mounting assemblies for a gas turbine engine are known in the art. While these known mounting assemblies have various advantages, there is still room in the art for improvement. For example, there is a need in the art for a mounting assembly that enables connection and disconnection of components within a gas turbine engine without complete removal of some or all of the mounting assembly hardware.

SUMMARY OF THE DISCLOSURE

According to an aspect of the present disclosure, an assembly is provided that includes a first component, a second component, a plurality of retainers and a fastener. The first component is configured with a plurality of first apertures. The second component is configured with a plurality of second apertures. Each of the retainers includes a pin and an arm projecting out from an end of the pin. The pin of each of the retainers is mated with a respective one of the first apertures and a respective one of the second apertures. The fastener is configured to fixedly connect the arm of each of the retainers to the first component. This assembly may be provided for an apparatus such as, but not limited to, a gas turbine engine.

According to another aspect of the present disclosure, another assembly is provided for a gas turbine engine. This gas turbine engine assembly includes a first component, a second component, a first retainer, a second retainer and a bolt. The first component of the gas turbine engine includes a first flange, a second flange and a mount. The first flange is configured with a plurality of first flange apertures. The second flange is configured with a plurality of second flange apertures. The second component of the gas turbine engine is arranged between the first flange and the second flange. The second component is configured with a plurality of second component apertures. The first retainer includes a first pin and a first arm cantilevered from an end of the first pin. The first pin projects along a first axis though a first of the first flange apertures, through a first of the second component apertures and at least partially into a first of the second flange apertures. The second retainer includes a second pin and a second arm cantilevered from an end of the second pin. The second pin projects along a second axis though a second of the first flange apertures, through a second of the second component apertures and at least partially into a second of the second flange apertures. The bolt is configured to secure the first arm and the second arm to the mount where the first arm and the second arm are each sandwiched between the mount and a head of the bolt.

The fastener may be configured as or otherwise include a bolt.

The fastener may be configured to: fixedly connect the arm of each of the retainers to a mount of the first component where the fastener is in a first position; and disconnect the arm of each of the retainers from the mount where the fastener is in a second position. The fastener may be connected to the first component in the first position and may be disconnected from the first component in the second position.

The fastener may be configured to: fixedly connect the arm of each of the retainers to a mount of the first component where the fastener is in a first position; and disconnect the arm of each of the retainers from the mount where the fastener is in a second position. The fastener may be connected to the first component in the first position and the second position.

The arm of each of the retainers may only be fixedly connected to the first component by the fastener.

The assembly may only include the single fastener for holding the retainers in position.

The arm of a first of the retainers may include a retainer head and a bridge that extends between and is connected to the retainer head and the pin of the first of the retainers. The retainer head may be stacked between a head of the fastener and the first component where the fastener fixedly connects the first of the retainers to the first component.

The retainer head may extend partially circumferentially about a shaft of the fastener where the fastener fixedly connects the first of the retainers to the first component.

The arm of a second of the retainers may include a second retainer head and a second bridge that extends between and is connected to the second retainer head and the pin of the second of the retainers. The second retainer head may be stacked between the head of the fastener and the first component where the fastener fixedly connects the second of the retainers to the first component. The second retainer head may not contact the retainer head where the fastener fixedly connects the first and the second retainers to the first component.

The arm of a second of the retainers may include a second retainer head and a second bridge that extends between and is connected to the second retainer head and the pin of the second of the retainers. The second retainer head may be stacked between the head of the fastener and the first component where the fastener fixedly connects the second of the retainers to the first component. The second retainer head may interlock with the retainer head where the fastener fixedly connects the first and the second retainers to the first component.

The arm of the first of the retainers may be configured with a slot that receives a protrusion of the first component.

The pin of a first of the retainers may project along an axis through the respective one of the first apertures and at least partially into the respective one of the second apertures. The first of the retainers may be configured to rotate about the axis between a first position and a second position while the fastener is connected to the first component. The fastener may be configured to retain the pin of the first of the retainers within the respective one of the first apertures and the respective one of the second apertures where the first of the retainers is in the first position. The pin of the first of the retainers may be operable to slide along the axis and move out of the respective one of the first apertures and the respective one of the second apertures where the first of the retainers is in the second position.

The pin of a first of the retainers may project along an axis through the respective one of the first apertures and at least partially into the respective one of the second apertures. The first of the retainers may be configured to translate along the axis between a first position and a second position while the fastener is connected to the first component. The fastener may be configured to retain the pin of the first of the retainers within the respective one of the first apertures and the respective one of the second apertures where the first of the retainers is in the first position. The pin of the first of the retainers may be operable to slide along the axis and move out of the respective one of the second apertures where the first of the retainers translates from the first position to or towards the second position.

The fastener may be configured to retain the pin of the first of the retainers within the respective one of the first apertures where the first of the retainers is in the second position.

The first of the retainers may be operable to translate along the axis between the first position and the second position while the fastener is connected to the first component without rotating about the axis.

The pin of a first of the retainers may project along an axis through the respective one of the first apertures and into the respective one of the second apertures. The pin of the first of the retainers may be configured with a circular cross-sectional geometry when viewed in a plane perpendicular to the axis.

The pin of a first of the retainers may project along an axis through the respective one of the first apertures and into the respective one of the second apertures. The pin of the first of the retainers may be configured with a polygonal cross-sectional geometry when viewed in a plane perpendicular to the axis.

A configuration of a first of the retainers may be a mirror image of a configuration of a second of the retainers where the retainers are fixedly connected to the first component.

A configuration of a first of the retainers may be identical to a configuration of a second of the retainers.

The first component and the second component may be configured as components of a gas turbine engine.

Each of the retainers may be configured as a discrete monolithic body.

The foregoing features and the operation of the disclosure will become more apparent in light of the following description and the accompanying drawings.

DETAILED DESCRIPTION

Figure 1:
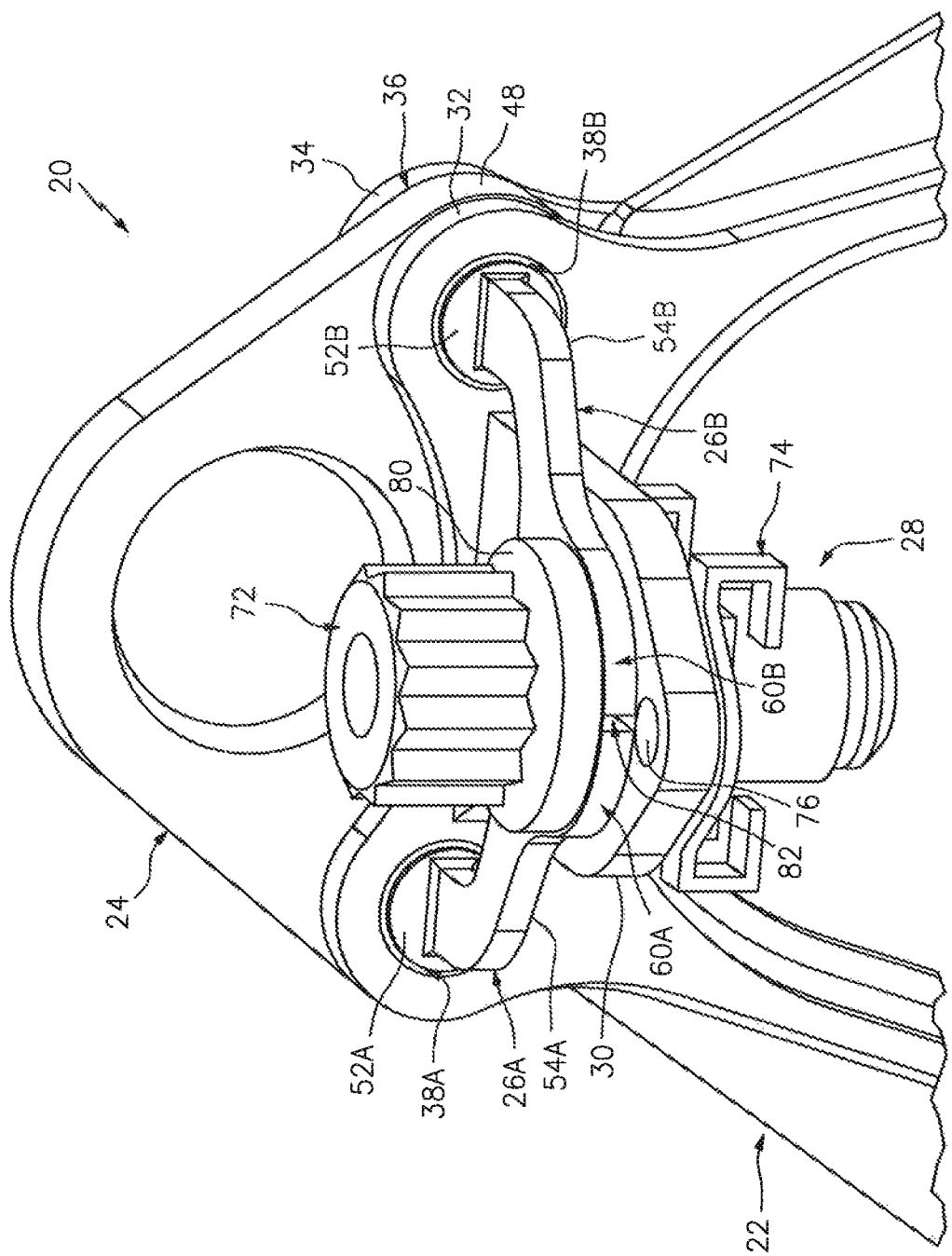
FIG. 1 is a perspective illustration of an assembly where a first component is mounted to a second component with a plurality of retainers and a fastener.

FIG. 1 illustrates an assembly 20 of an apparatus such as, but not limited to, a gas turbine engine. This assembly 20 includes a first component 22, a second component 24, a plurality of retainers 26A and 26B (generally referred to as "26") and a fastening apparatus 28.

Figure 2:
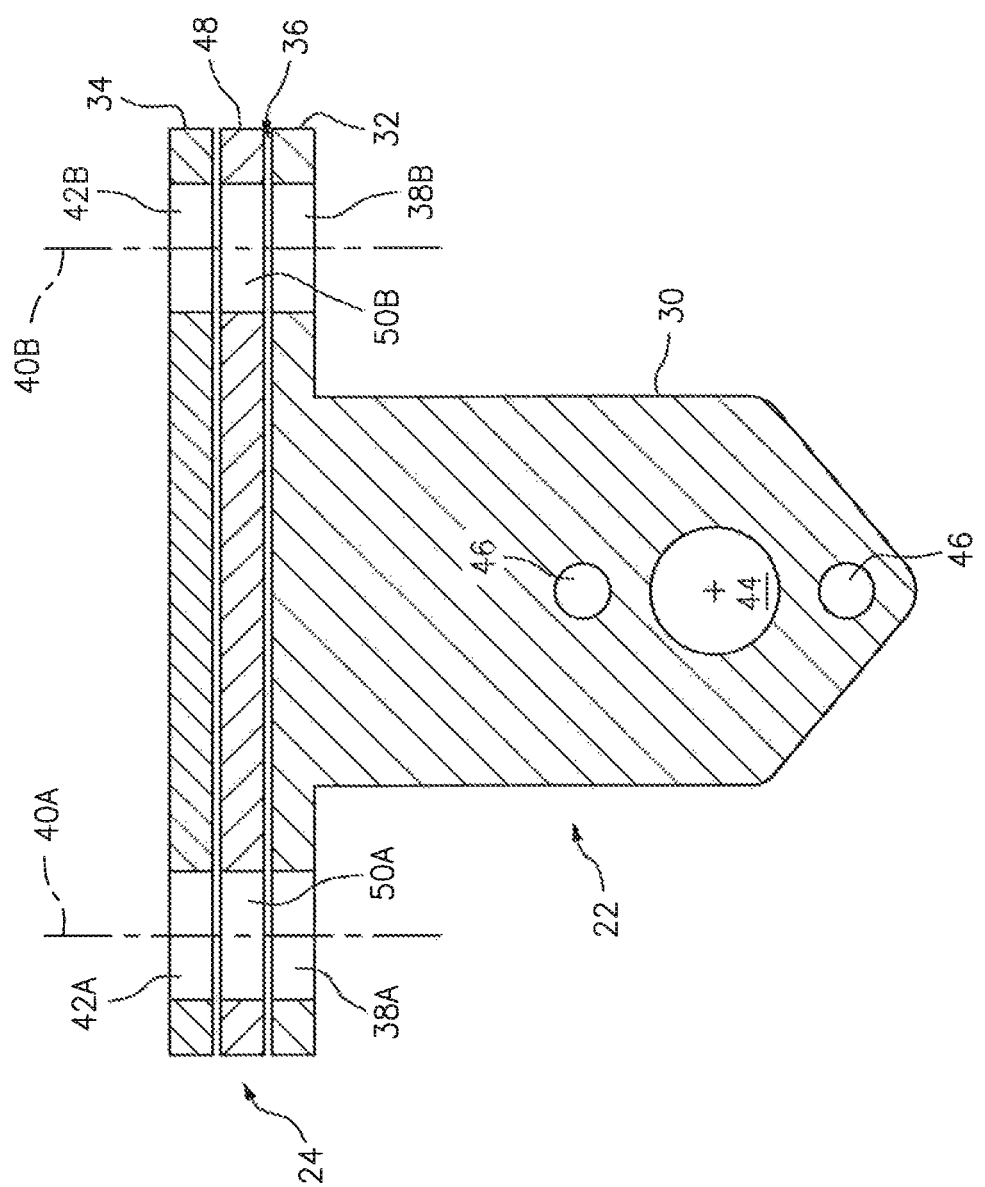
FIG. 2 is a sectional illustration of the first and the second components.

The first component 22 of the apparatus (e.g., gas turbine engine) includes one or more first component mounting flanges and a mount 30. The first component 22 of FIG. 1, for example, includes a front mounting flange 32 and a rear mounting flange 34. Note, the terms "front" and "rear" are used to describe the position of the flanges relative to the mount 30 and are not intended to limit the orientation of the assembly 20 in the apparatus. Referring to FIG. 2, the front mounting flange 32 and the rear mounting flange 34 are arranged substantially (e.g., ±1-5°) parallel with one another and form a channel 36 therebetween.

The front mounting flange 32 is configured with a plurality of front mounting flange apertures 38A and 38B (generally referred to as "38"); e.g., through-holes. The front mounting flange aperture 38A extends along an axis 40A (e.g., a centerline) through the front mounting flange 32. The front mounting flange aperture 38B extends along an axis 40B (e.g., a centerline) through the front mounting flange 32. The axis 40A may be substantially (e.g., +/−5°) parallel with the axis 40B.

The rear mounting flange 34 is configured with a plurality of rear mounting flange apertures 42A and 42B (generally referred to as "42"); e.g., through-holes. The rear mounting flange aperture 42A is aligned (e.g., co-axial) with the front mounting flange aperture 38A. The rear mounting flange aperture 42A thereby extends along the axis 40A through (or partially into) the rear mounting flange 34. The rear mounting flange aperture 42B is aligned (e.g., co-axial) with the front mounting flange aperture 38B. The rear mounting flange aperture 42B thereby extends along the axis 40B through (or partially into) the rear mounting flange 34.

The mount 30 of FIGS. 1 and 2 is configured as a mounting tab. This mount 30 is connected to and projects out from the front mounting flange 32 in a (e.g., frontward) direction away from the rear mounting flange 34. The mount 30 of FIGS. 1 and 2 is cantilevered from the front mounting flange 32 and is arranged substantially (e.g., +/−5°) perpendicular to the front mounting flange 32. Referring to FIG. 2, the mount 30 is configured with a fastener aperture 44 (e.g., a through-hole) which extends through (or partially into) the mount 31). In the embodiment of FIG. 2, the fastener aperture 44 is not tapped/threaded; however, in other embodiments the fastener aperture 44 may be a tapped/threaded fastener aperture. The mount 30 of FIG. 2 is also configured with one or more additional fastener apertures 46; e.g., through-holes.

The first component 22 of FIG. 1 is configured as a mounting device (e.g., a mounting bracket) that is removably connected to another component (e.g., a case; not shown) of the apparatus. However, in other embodiments, the mounting device and the other component may be configured together as a single integral unit.

Referring to FIG. 1, the second component 24 of the apparatus (e.g., gas turbine engine) includes at least one second component mounting flange 48; e.g., an intermediate mounting flange. Referring to FIG. 2, this second component mounting flange 48 is configured to be received within the channel 36. The second component mounting flange 48 is configured with a plurality of intermediate mounting flange apertures 50A and 50B (generally referred to as "50"); e.g., through holes. The intermediate mounting flange aperture 50A is configured to be aligned (e.g., co-axial) with the front mounting flange aperture 38A and the rear mounting flange aperture 42B when the components 22 and 24 are mated together. The intermediate mounting flange aperture 50A thereby extends along the axis 40A through (or partially into where the rear mounting flange 34 is omitted) the second component mounting flange 48. Similarly, the intermediate mounting flange aperture 50B is configured to be aligned (e.g., co-axial) with the front mounting flange aperture 38B and the rear mounting flange aperture 42B when the components 22 and 24 are mated together. The intermediate mounting flange aperture 50B thereby extends along the axis 40B through (or partially into where the rear mounting flange 34 is omitted) the second component mounting flange 48.

The second component 24 of FIG. 1 is configured as a mounting device (e.g., a mounting bracket) that is removably connected to another component (e.g., an actuator; not shown) of the apparatus. However, in other embodiments, the mounting device and the other component may be configured together as a single integral unit.

Referring still to FIG. 1, a configuration (e.g., geometry, size, etc.) of the retainer 26A may be a mirror image of a configuration (e.g., geometry, size, etc.) of the retainer 26B when those retainers 26 are fixedly connected to the first component 22 as described below in further detail. In addition, the configuration of the retainer 26A may be identical to the configuration of the retainer 26B when oriented in the same manner, which identical configuration enables production of generic retainers that may be oriented as shown in FIG. 1 to provide the retainers 26A and 26B. The present disclosure, however, is not limited to including identical and/or mirror image retainers 26.

Figure 3:
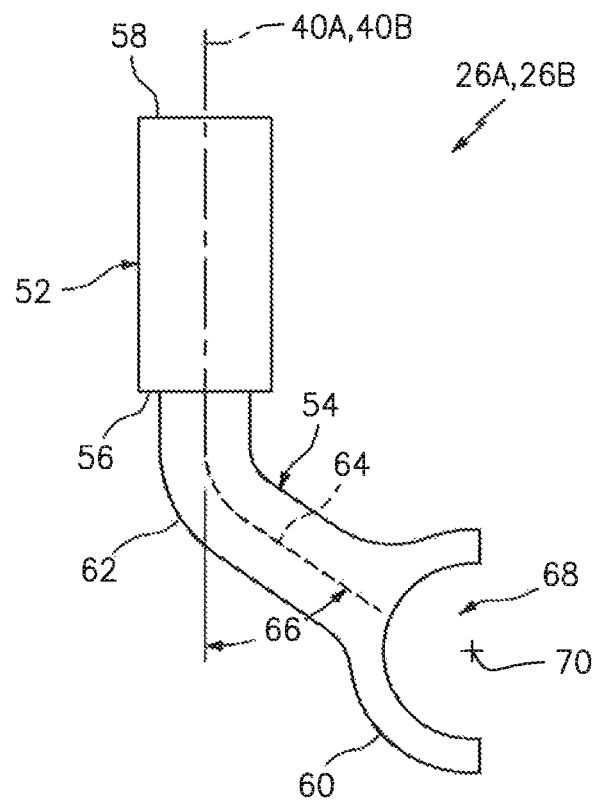
FIG. 3 is a side view illustration of an exemplary one of the retainers.
Figure 4:
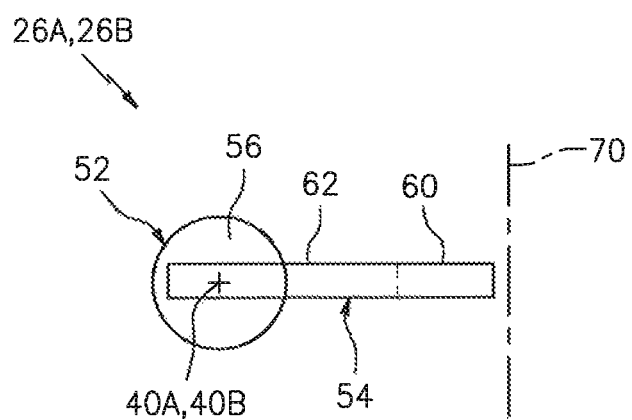
FIG. 4 is an end view illustration of the retainer of FIG. 3.

FIGS. 3 and 4 illustrate an exemplary embodiment of one of the retainers 26A and 26B. This retainer 26 includes a retainer pin 52 and a retainer arm 54 that projects out (e.g., is cantilevered) from an end 56 of the pin 52. The pin 52 projects along an axis (e.g., the axis 40A, 40B when mated with the apertures of FIG. 2 as described below) from the end 56 to a distal end 58 of the retainer 26. The pin 52 of FIG. 4 is configured with a circular cross-sectional geometry when viewed in a plane perpendicular to the axis 40A, 40B.

The arm 54 of FIGS. 3 and 4 includes a retainer head 60 and a bridge 62 (e.g., an extension) that extends between and is connected to the head 60 and the pin 52. As the bridge 62 extends from the pin 52 to the head 60, a trajectory 64 of the bridge 62 may change such that the trajectory 64 at the pin 52 is angularly offset from the trajectory 64 at the head 60 by an angle 66 between, for example, forty-five degrees (45°) and one-hundred and thirty-five degrees (135°); e.g., about sixty degrees (60°+/−5°).

Referring to FIG. 3, the head 60 is configured with a channel 68/indentation. This channel 68 of FIG. 3 has a substantially semi-circular cross-sectional geometry. To form the channel 68, the head 60 extends partially circumferentially about an axis 70, where the axis 70 is substantially (e.g., +/−5°) perpendicular to and laterally offset from the axis 40A, 40B of the pin 52. With this configuration, the head 60 is configured with an annular and semi-circular cross-sectional geometry when viewed in a plane perpendicular to the axis 70. The present disclosure, however, is not limited to the foregoing exemplary channel and/or head configurations.

Each retainer 26 may be configured as a unitary body; e.g., a discrete monolithic body. For example, the retainer components 52 and 54 may be cast, machined, additively manufactured and/or otherwise formed as a single body. However, the present disclosure is not limited to such an exemplary configuration; e.g., in other embodiments, the components 52 and 54 may be discretely formed and then bonded (e.g., welded) together.

Referring to FIG. 1, the fastener apparatus 28 includes a single fastener 72 such as, but not limited to, a bolt. The fastener apparatus 28 may also include a nut plate 74 as shown in FIG. 1. This nut plate 74 is connected to an underside of the mount 30 via, for example, one or more fasteners 76 (e.g., rivets; only one visible in FIG. 1) that mate with the additional fastener apertures 46 of FIG. 2. Various types and configurations of nut plates are known in the art and the present disclosure is not limited to any particular ones thereof. Furthermore, while FIG. 1 is shown with the nut plate 74, in other embodiments the nut plate 74 may be omitted where, for example, the fastener aperture 44 (see FIG. 2) is a tapped fastener aperture that can directly mate with the fastener 72 and function as a nut.

Figure 5:
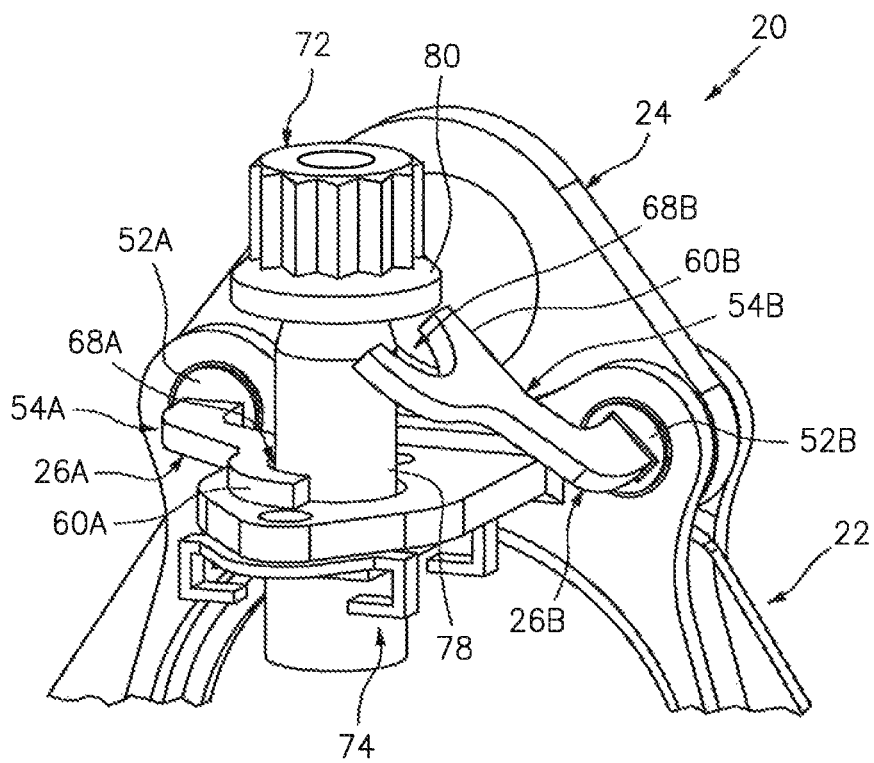
FIG. 5 is a perspective illustration of the assembly of FIG. 1 with one of the retainers pivoted to an open position and the fastener in a loosened position.
Figure 6:
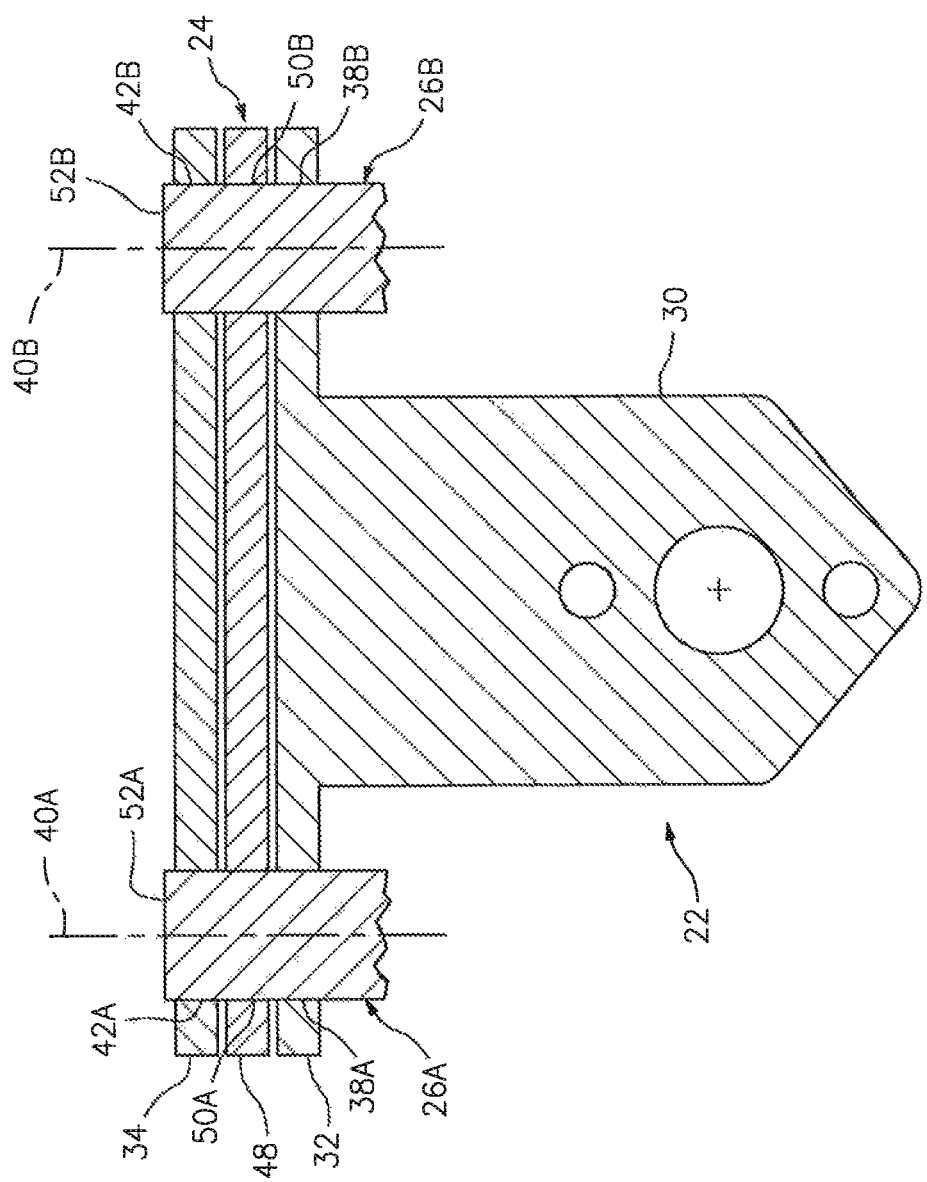
FIG. 6 is a sectional view of the first and the second components mated with pins of the retainers, where only select portions of the retainers are shown.

To connect the second component 24 to the first component 22, the second component mounting flange 48 is inserted into the channel 36 between the front mounting flange 32 and the rear mounting flange 34 as shown in FIG. 2. The fastener 72 is mated with the nut plate 74 as shown in FIG. 5, which mating connects the fastener 72 to the mount 30 of the first component 22. Each pin 52 is mated with the respective apertures 38, 50 and 42 as shown in FIG. 6 by inserting the pin 52 into the respective aperture 38 and then translating the pin 52 along its axis 40 such that the pin 52 is pushed through the aperture 38, pushed through the aperture 50 and then pushed into (or through) the aperture 42. Each retainer 26 may then be rotated about its axis 40 from a disengaged/open position (see retainer 26B in FIG. 5) to an engaged/closed position (see retainer 26B in FIG. 7). In the engaged position, the fastener 72 is positioned within the channel 68 and the head 60 wraps partially circumferentially about a shaft 78 of the fastener 72. By contrast, in the disengaged position (see retainer 26B in FIG. 5), the fastener 72 is outside of the channel 68. Next, the fastener 72 is threaded further into the nut plate 74 until the heads 60A and 60B of the retainers 26A and 26B are stacked and sandwiched between a head 80 of the fastener 72 and a topside of the mount 30 of the first component 22. This sandwiching fixedly secures the retainers 26A and 26B to the mount 30 and thereby prevents the retainers 26 from rotating about their axes 40A and 40B and disengaging from the fastener 72. Thus, in the position of FIG. 1, the fastener 72 is configured to fixedly connect both arms 54A and 54B to the mount 30.

Figure 7:
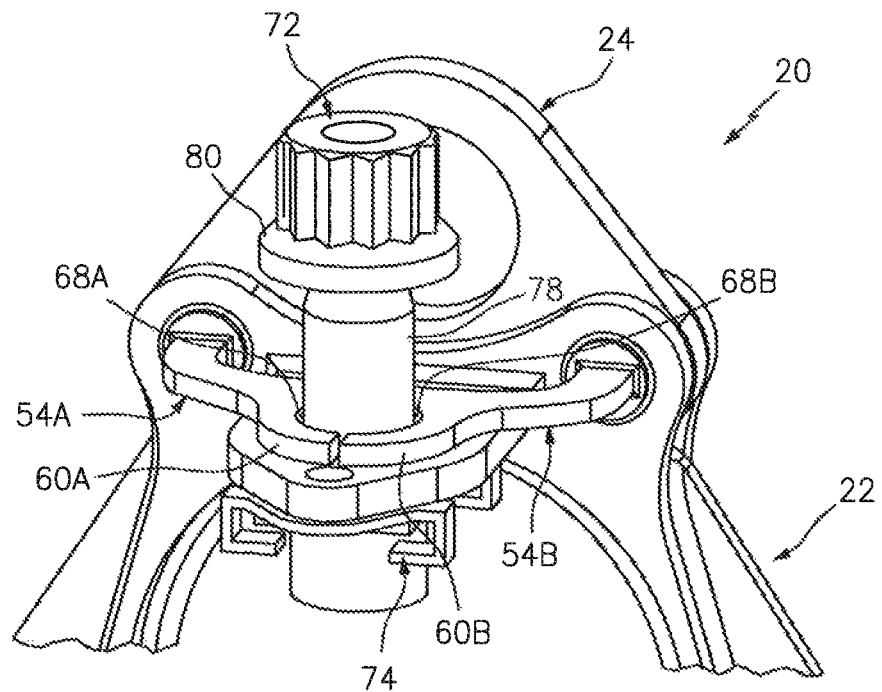
FIG. 7 is a perspective illustration of the assembly of FIG. 1 with the fastener in the loosened position and the retainers in closed positions.

To disconnect the second component 24 from the first component 22, the fastener 72 is moved from its position in FIG. 1 to its position in FIG. 7. This enables each of the retainers 26A and 26B to be rotated about its respective axis 40A, 40B until the head 60 of that retainer 26 is no longer engageable with the fastener 72; e.g., see disengaged position of the retainer 26B in FIG. 5. Thus, in the position of FIG. 5, the fastener 72 is configured to disconnect the arms 54A and 54B from the mount 30 and, enable movement thereof. The retainers 26 may then be translated about their axes 40 until the pins 52 are pulled out of at least the apertures 42 and 50 (see FIGS. 2 and 6). This disconnects the second component mounting flange 48 from the front mounting flange 32 and the rear mounting flange 34 and enables the second component 24 to be pulled away from the first component 22. Note, during the disconnection process, the fastener 72 may (but, need not) remain connected to the first component 22. This may decrease the likelihood of dropping a component such as the fastener 72 within the apparatus (e.g., a gas turbine engine) which could later cause damage to the apparatus if not removed before operation.

Figure 8:
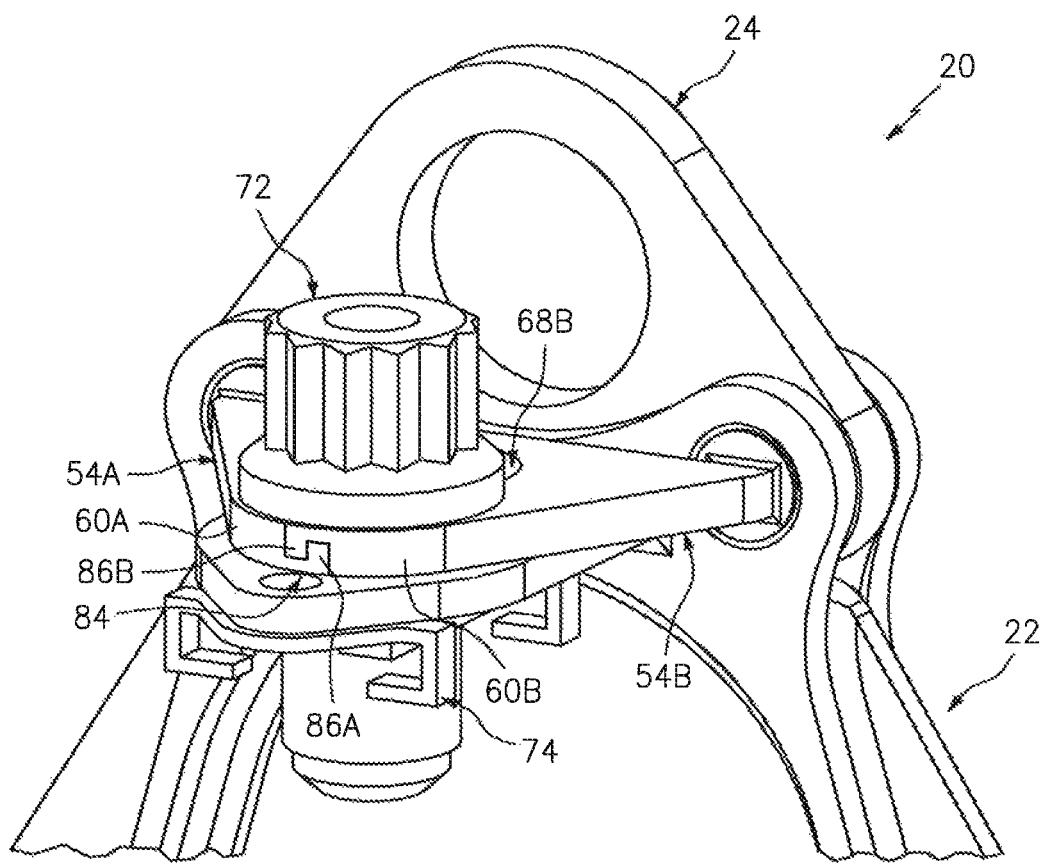
FIG. 8 is a perspective illustration of an alternative assembly.
Figure 9:
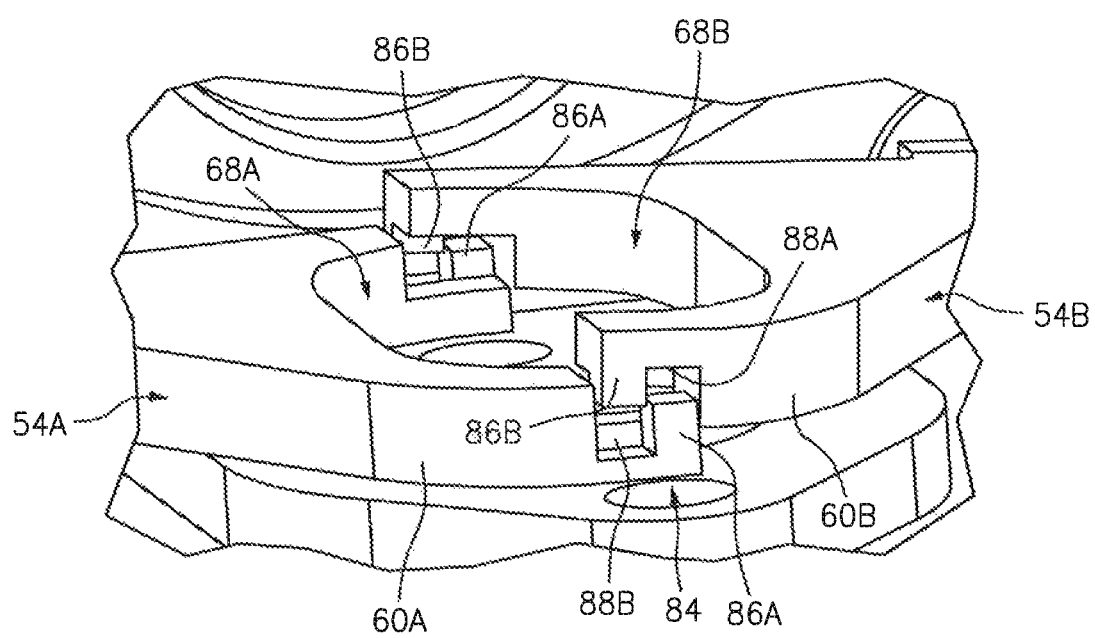
FIG. 9 is a perspective illustration of a portion of the assembly of FIG. 8 with its fastener removed and its retainers pivoted slightly open.

In some embodiments, referring to FIG. 1, a distal end of the arm 54A may be separated from the distal end of the arm 54B by a gap 82. This gap 82 prevents the arms 54A and 54B from engaging (e.g., contacting) one another in the orientation of FIG. 1. However, in other embodiments as shown in FIGS. 8 and 9 for example, the arms 54A and 54B may be configured to engage one another at a joint 84. At this joint 84, the distal ends of the arms 54A and 54B may interlock with one another. For example, protrusions 86A on the arm 54A may be received by notches 88B in the arm 54B and protrusions 86B on the arm 54B may be similarly received by notches 88A in the arm 54A. This interlocking joint 84 may serve to maintain both axial (relative to axes 40) and lateral alignment between the arms 54. The present disclosure, however, is not limited to the specific exemplary interlocking configuration shown in FIGS. 8 and 9.

In some embodiments, referring to FIG. 3, the channel 68 of each arm 54 may be semi-circular. However, in other embodiments, the channel 68A, B may be elongated (e.g., semi-oval, etc.) as shown in FIG. 9. With such a configuration, the retainers 26 may be rotated about and translated along the axes 40 as described above and shown in FIG. 10. Alternatively, the retainers 26 may be translated along the axes 40 (see FIGS. 3 and 6) without being rotated as shown in FIG. 11.

Figure 10:
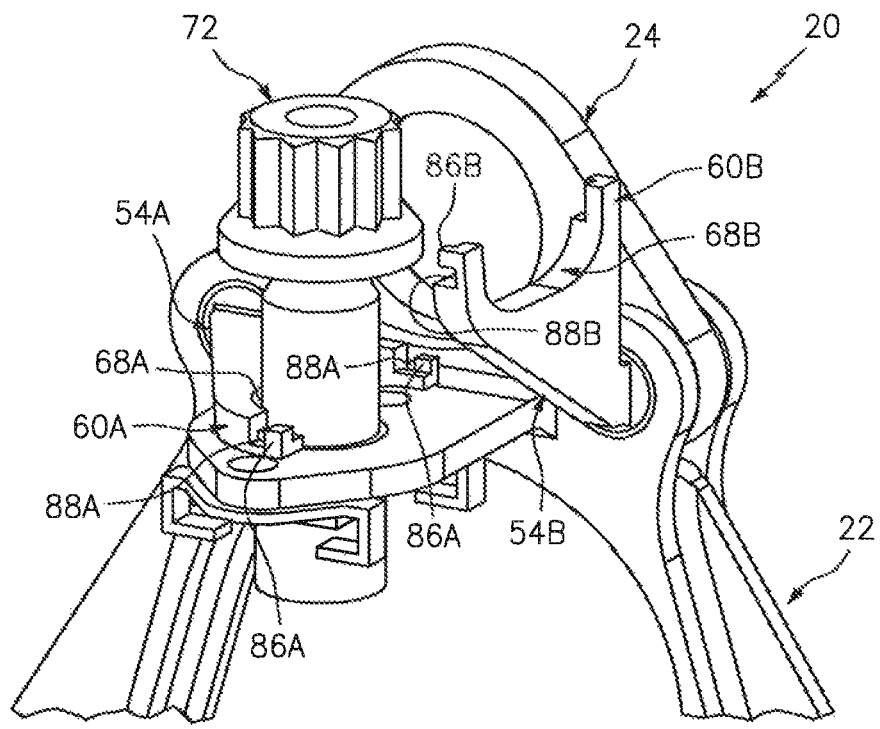
FIG. 10 is a perspective illustration of the assembly of FIG. 8 with one of the retainers pivoted to an open position and the fastener in a loosened position.
Figure 11:
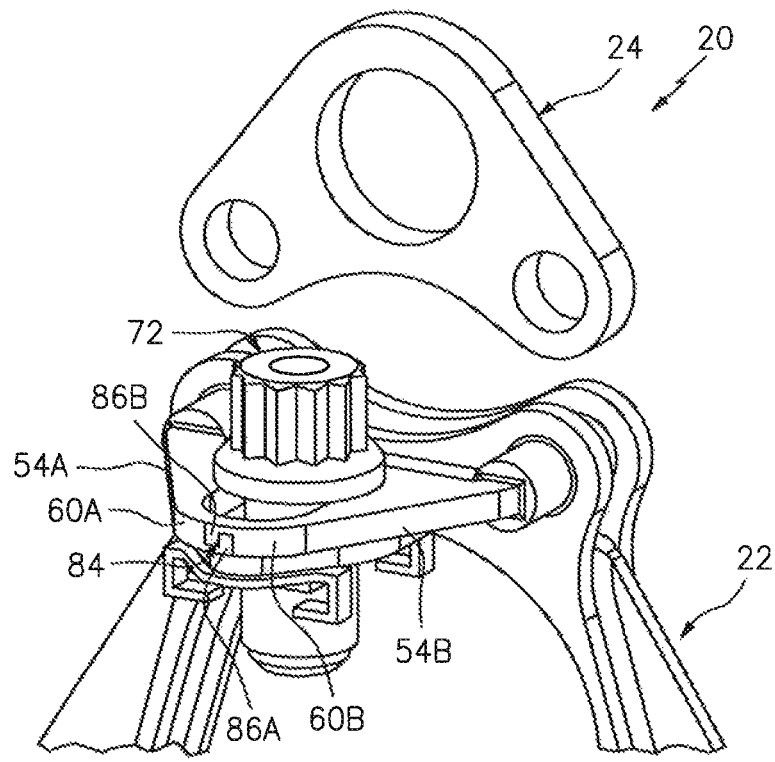
FIG. 11 is a perspective illustration of the assembly of FIG. 8 with the fastener in the loosened position and the retainers in disengaged positions.

In some embodiments, referring to FIG. 10, the head 60 of each (or one) of the arms 54 may extend about (e.g., +/−5 or 10°) one-hundred and eighty degrees (180°) circumferentially about the fastener 72. In other embodiments, referring to FIG. 12, the head 60 of each (or one) of the arms 54 may extend less than one-hundred and eighty degrees (180°) circumferentially about the ibstener 72; e.g., between about eighty to ninety degrees (80-90°).

Figure 12:
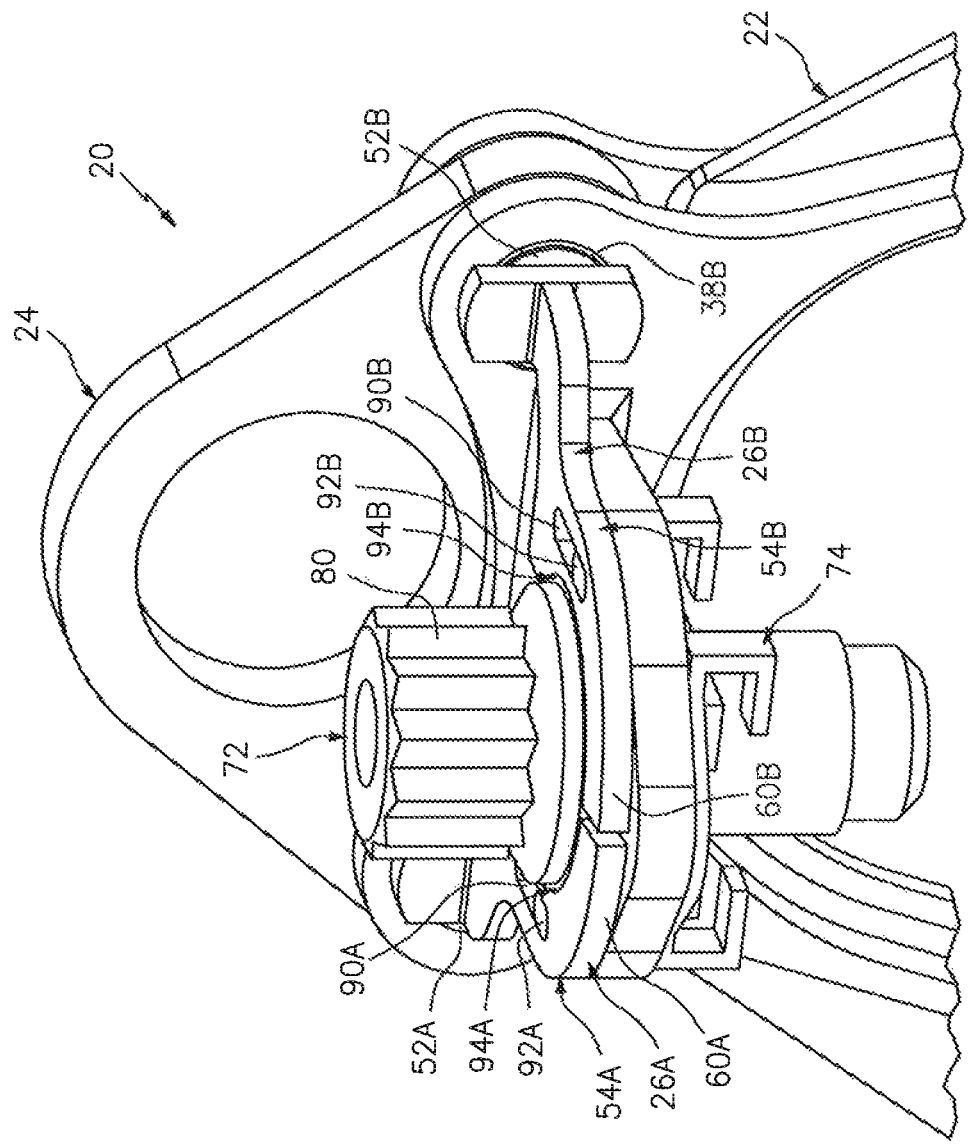
FIG. 12 is a perspective illustration of an alternative assembly.
Figure 13:
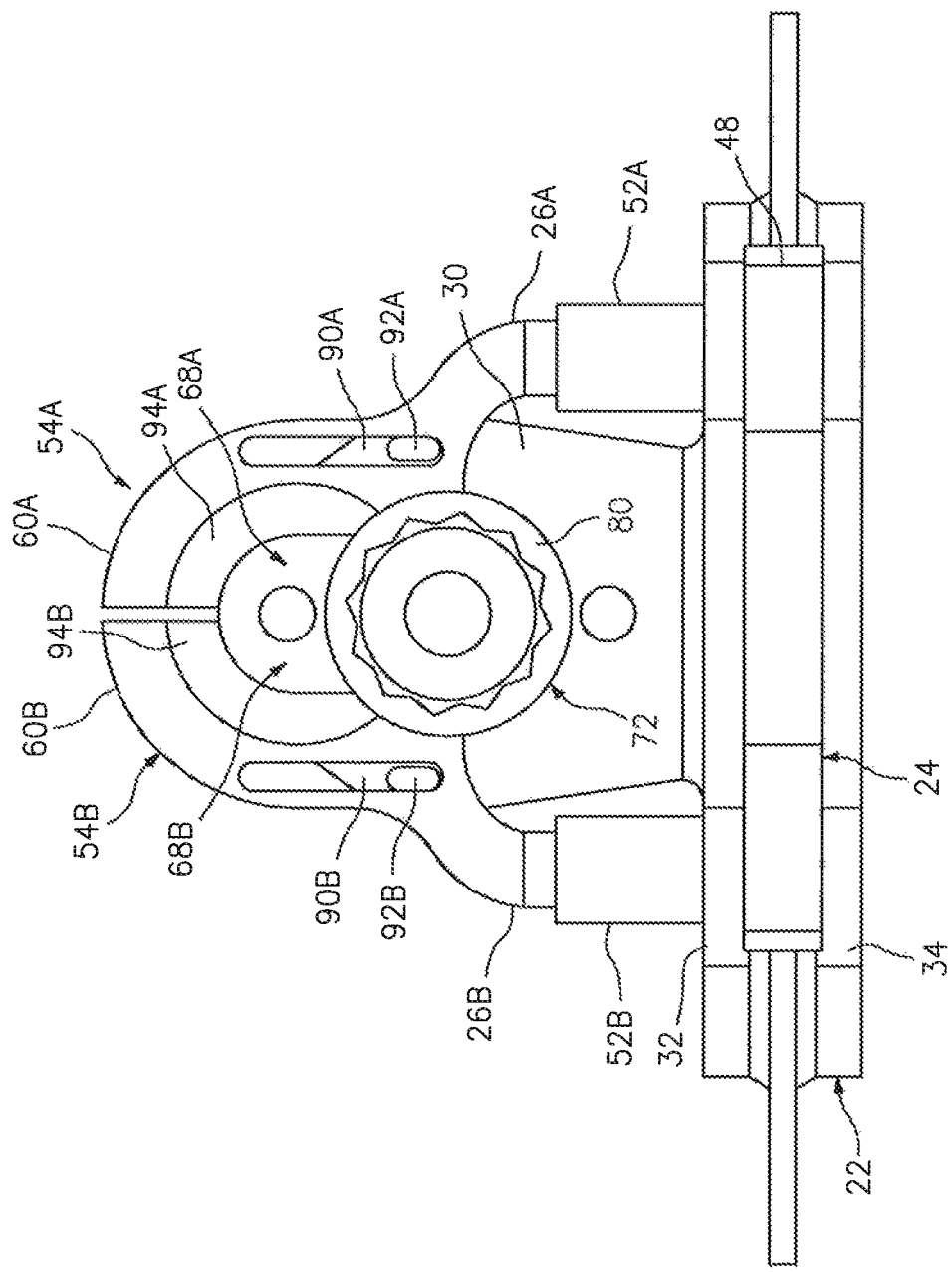
FIG. 13 is a side view illustration of the assembly of FIG. 12 with its retainers in disengaged positions.

In some embodiments, referring to FIGS. 12 and 13, each (or one) of the arms 54A and 54B may include a slot 90A, B that receives a protrusion 92A, B that projects out from the topside of the mount 30. This protrusion 92A, B may function as a guide to limit the axial translation of the pin 52A, B. With the configuration of FIGS. 13 and 14, the fastener 72 may remain connected to the mount 30 and the pins 52 may remain within the apertures 38A and 38B (see also FIG. 6) during the disconnecting of the second component 24 from the first component 22. As a result, there is less likelihood of a component being dropped and/or lost within the apparatus during connecting and disconnecting the components.

In some embodiments, each of the heads 60A, B may include a recess 94A, B for receiving the fastener head 80 as shown in FIG. 13. A shoulder defining the periphery of this recess 94A, B may function as a stop to prevent axial translation of the respective retainer 26A, B when the fastener head 80 is within the recess 94A, B.

Figure 14:
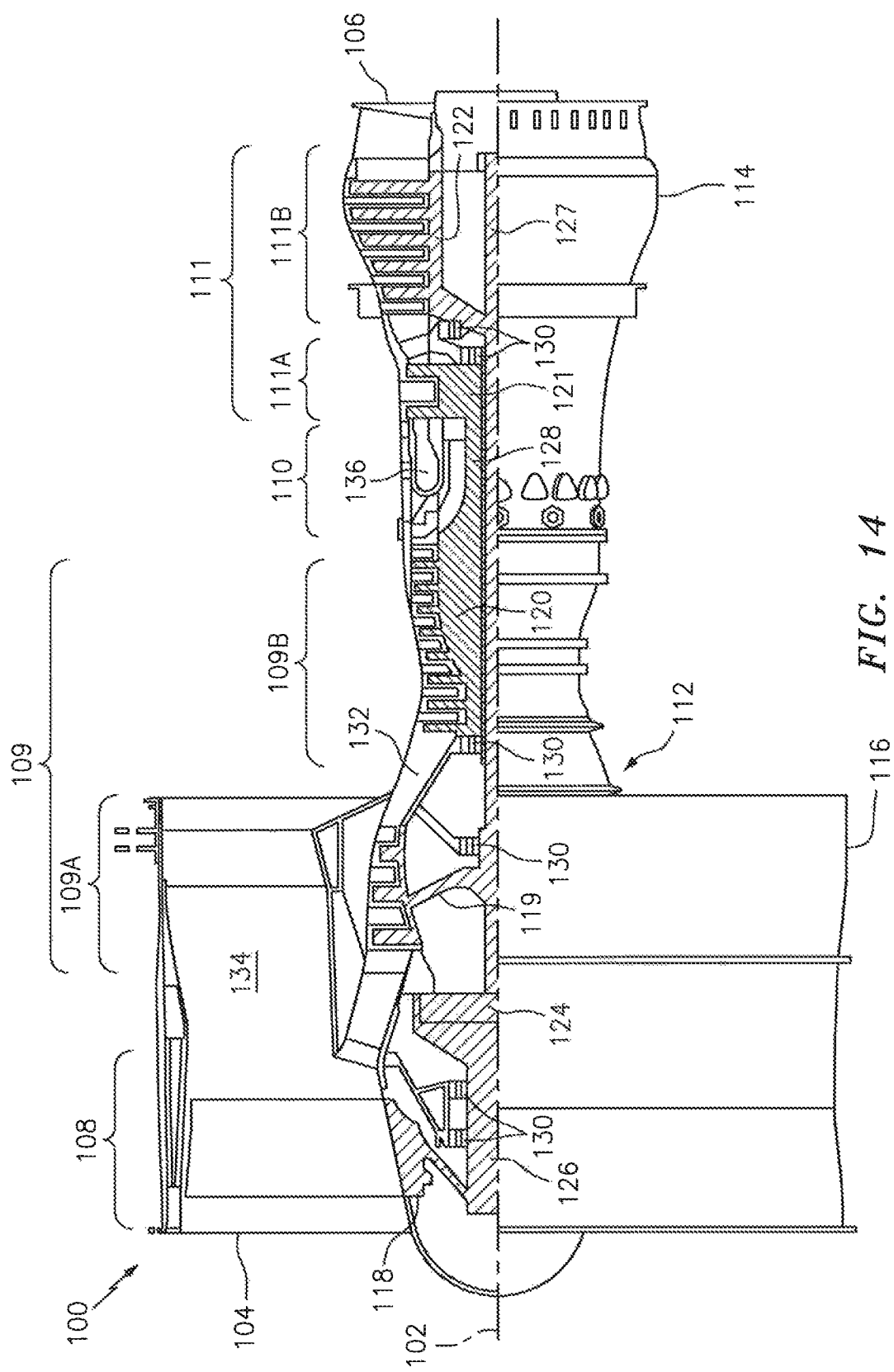
FIG. 14 is a side cutaway illustration of a geared turbofan gas turbine engine with which an assembly as shown in the above described figures may be included.

As described above, the assembly 20 may be configured as part of an apparatus such as, but not limited to, a gas turbine engine. An exemplary embodiment of such a gas turbine engine 100 is shown in FIG. 14. This gas turbine engine 100 is configured as a geared turbine engine. The turbine engine 100 extends along an axial centerline 102 between an upstream airflow inlet 104 and a downstream airflow exhaust 106. The turbine engine 100 includes a fan section 108, a compressor section 109, a combustor section 110 and a turbine section 111. The compressor section 109 includes a low pressure compressor (LPC) section 109A and a high pressure compressor (HPC) section 109B. The turbine section 111 includes a high pressure turbine (HPT) section 111A and a low pressure turbine (LPT) section 111B.

The engine sections 108-111 are arranged sequentially along the centerline 102 within an engine housing 112. This housing 112 includes an inner case 114 (e.g., a core case) and an outer case 116 (e.g., a fan case). The inner case 114 may house one or more of the engine sections 109-111; e.g., an engine core. The outer case 116 may house at least the fan section 108.

Each of the engine sections 108, 109A, 109B, 111A and 111B includes a respective rotor 118-122. Each of these rotors 118-122 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 118 is connected to a gear train 124, for example, through a fan shaft 126. The gear train 124 and the LPC rotor 119 are connected to and driven by the LPT rotor 122 through a low speed shaft 127. The HPC rotor 120 is connected to and driven by the HPT rotor 121 through a high speed shaft 128. The shafts 126-128 are rotatably supported by a plurality of bearings 130; e.g., rolling element and/or thrust bearings. Each of these bearings 130 is connected to the engine housing 112 by at least one stationary structure such as, for example, an annular support strut.

During operation, air enters the turbine engine 100 through the airflow inlet 104. This air is directed through the fan section 108 and into a core gas path 132 and a bypass gas path 134. The core gas path 132 extends sequentially through the engine sections 109-111. The air within the core gas path 132 may be referred to as "core air". The bypass gas path 134 extends through a bypass duct, which bypasses the engine core. The air within the bypass gas path 134 may be referred to as "bypass air".

The core air is compressed by the compressor rotors 119 and 120 and directed into a combustion chamber 136 of a combustor in the combustor section 110. Fuel is injected into the combustion chamber 136 and mixed with the compressed core air to provide a fuel-air mixture. This fuel air mixture is ignited and combustion products thereof flow through and sequentially cause the turbine rotors 121 and 122 to rotate. The rotation of the turbine rotors 121 and 122 respectively drive rotation of the compressor rotors 120 and 119 and, thus, compression of the air received from the core airflow inlet. The rotation of the turbine rotor 122 also drives rotation of the fan rotor 118, which propels bypass air through and out of the bypass gas path 134. The propulsion of the bypass air may account for a majority of thrust generated by the turbine engine 100, e.g., more than seventy-five percent (75%) of engine thrust. The turbine engine 100 of the present disclosure, however, is not limited to the foregoing exemplary thrust ratio.

The assembly 20 may be included in various turbine engines other than the one described above as well as in other types of rotational equipment and other types of non-rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 14), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or other equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly, comprising:
 a first component configured with a plurality of first apertures;
 a second component configured with a plurality of second apertures;
 a plurality of retainers, each of the retainers including a pin and an arm projecting out from an end of the pin, and the pin of each of the retainers mated with a respective one of the first apertures and a respective one of the second apertures; and
 a fastener configured to fixedly connect the arm of each of the retainers to the first component;
 the arm of a first of the retainers including a retainer head and a bridge that extends between and is connected to the retainer head and the pin of the first of the retainers; and
 the retainer head stacked between a head of the fastener and the first component where the fastener fixedly connects the first of the retainers to the first component.

2. The assembly of claim 1, wherein the fastener comprises a bolt.

3. The assembly of claim 1, wherein the fastener is configured to
 fixedly connect the arm of each of the retainers to a mount of the first component where the fastener is in a first position;
 disconnect the arm of each of the retainers from the mount where the fastener is in a second position; and
 the fastener is connected to the first component in the first position and is disconnected from the first component in the second position.

4. The assembly of claim 1, wherein the fastener is configured to
 fixedly connect the arm of each of the retainers to a mount of the first component where the fastener is in a first position;
 disconnect the arm of each of the retainers from the mount where the fastener is in a second position; and
 the fastener is connected to the first component in the first position and the second position.

5. The assembly of claim 1, wherein the arm of each of the retainers is only fixedly connected to the first component by the fastener.

6. The assembly of claim 1, wherein the retainer head extends partially circumferentially about a shaft of the fastener where the fastener fixedly connects the first of the retainers to the first component.

7. The assembly of claim 1, wherein
 the arm of a second of the retainers includes a second retainer head and a second bridge that extends between and is connected to the second retainer head and the pin of the second of the retainers;
 the second retainer head is stacked between the head of the fastener and the first component where the fastener fixedly connects the second of the retainers to the first component; and
 the second retainer head does not contact the retainer head where the fastener fixedly connects the first and the second retainers to the first component.

8. The assembly of claim 1, wherein
 the arm of a second of the retainers includes a second retainer head and a second bridge that extends between and is connected to the second retainer head and the pin of the second of the retainers;
 the second retainer head is stacked between the head of the fastener and the first component where the fastener fixedly connects the second of the retainers to the first component; and
 the second retainer head interlocks with the retainer head where the fastener fixedly connects the first and the second retainers to the first component.

9. The assembly of claim 1, wherein the arm of the first of the retainers is configured with a slot that receives a protrusion of the first component.

10. The assembly of claim 1, wherein
 the pin of a first of the retainers projects along an axis through the respective one of the first apertures and at least partially into the respective one of the second apertures;
 the first of the retainers is configured to rotate about the axis between a first position and a second position while the fastener is connected to the first component;
 the fastener is configured to retain the pin of the first of the retainers within the respective one of the first apertures and the respective one of the second apertures where the first of the retainers is in the first position; and
 the pin of the first of the retainers is operable to slide along the axis and move out of the respective one of the first apertures and the respective one of the second apertures where the first of the retainers is in the second position.

11. The assembly of claim 1, wherein
 the pin of a first of the retainers projects along an axis through the respective one of the first apertures and at least partially into the respective one of the second apertures;

the first of the retainers is configured to translate along the axis between a first position and a second position while the fastener is connected to the first component;

the fastener is configured to retain the pin of the first of the retainers within the respective one of the first apertures and the respective one of the second apertures where the first of the retainers is in the first position; and the pin of the first of the retainers is operable to slide along the axis and move out of the respective one of the second apertures where the first of the retainers translates from the first position to or towards the second position.

12. The assembly of claim 11, wherein the fastener is configured to retain the pin of the first of the retainers within the respective one of the first apertures where the first of the retainers is in the second position.

13. The assembly of claim 11, wherein the first of the retainers is operable to translate along the axis between the first position and the second position while the fastener is connected to the first component without rotating about the axis.

14. The assembly of claim 1, wherein
the pin of a first of the retainers projects along an axis through the respective one of the first apertures and into the respective one of the second apertures; and
the pin of the first of the retainers is configured with a circular cross-sectional geometry when viewed in a plane perpendicular to the axis.

15. The assembly of claim 1, wherein a configuration of a first of the retainers is a mirror image of a configuration of a second of the retainers where the retainers are fixedly connected to the first component.

16. The assembly of claim 1, wherein a configuration of a first of the retainers is identical to a configuration of a second of the retainers.

17. The assembly of claim 1, wherein the first component and the second component are configured as components of a gas turbine engine.

18. An assembly of a gas turbine engine, comprising:
a first component of the gas turbine engine comprising a first flange, a second flange and a mount, the first flange configured with a plurality of first flange apertures, and the second flange configured with a plurality of second flange apertures;

a second component of the gas turbine engine arranged between the first flange and the second flange, the second component configured with a plurality of second component apertures;

a first retainer including a first pin and a first arm cantilevered from an end of the first pin, the first pin projecting along a first axis though a first of the first flange apertures, through a first of the second component apertures and at least partially into a first of the second flange apertures;

a second retainer including a second pin and a second arm cantilevered from an end of the second pin, the second pin projecting along a second axis though a second of the first flange apertures, through a second of the second component apertures and at least partially into a second of the second flange apertures; and a bolt configured to secure the first arm and the second arm to the mount where the first arm and the second arm are each sandwiched between the mount and a head of the bolt.

19. An assembly, comprising:
a first component configured with a plurality of first apertures;

a second component configured with a plurality of second apertures;

a plurality of retainers, each of the retainers including a pin and an arm projecting out from an end of the pin, and the pin of each of the retainers mated with a respective one of the first apertures and a respective one of the second apertures; and a fastener configured to fixedly connect the arm of a first of the retainers and the arm of a second of the retainers to the first component, wherein the arm of the first of the retainers and the arm of the second of the retainers are configured to be clamped between a head of the fastener and the first component.

* * * * *